United States Patent Office 3,000,796
Patented Sept. 19, 1961

3,000,796
PROCESS FOR INHIBITING THE POLYMERIZATION OF α-CHLORACRYLATE ESTERS
Harry D. Anspon, Easton, Pa., assignor to General Aniline & Film Corporation, New York, N.Y., a corporation of Delaware
No Drawing. Filed Apr. 3, 1957, Ser. No. 650,306
7 Claims. (Cl. 202—57)

This invention relates to improvements in the manufacture, processing and treatment of polymerizable unsaturated halogen-containing organic compounds and in particular, to α-chloracrylic acid esters and derivatives thereof. Specifically, this invention relates to improvements whereby the handling of such monomeric materials is facilitated during storage processing and treatments thereof involving the application of heat and other polymerization aids.

The esters of α-chloracrylic acid, and particularly the lower alkyl esters such as methyl, ethyl, propyl, isopropyl, butyl and the like have become increasingly important base materials useful in the manufacture of polymers, which polymers are possessed of outstanding, unusual and unexpected properties. Among the various properties of such polymeric materials are those outstanding physical properties of high heat distortion temperature, high flexural and tensile strength, excellent craze resistance, low notch sensitivity, unique self-extinguishing characteristics in burning tests and complete formability which make these polymers particularly suited for use as a glazing material, especially for the glazing of high-speed aircraft. Among the well known chemical properties of the monomers from which these polymeric materials are prepared is the extreme sensitivity of the monomer to polymerization. In order to prepare a polymer suitable for use as a glazing material and which will be characterized by the above described advantageous physical properties and, in addition, have the desirable and absolutely necessary optical characteristics, it has been discovered that the monomer, before it is subjected to polymerizing conditions to form the final product, must be in an exceptional state of purity otherwise one of several of the above described physical characteristics will suffer thereby. In addition, if the monomer is not handled with the utmost care, and if purification is not carried out to the utmost degree, there will arise in the final shaped polymer, or in the polymer subjected to deforming operations in the making of glazing materials such as canopies and the like, the formation of undesirable color bodies or undesirable bubble formation. It is thus of paramount importance to conduct the preparation of the monomer under the most stringent of conditions in order to successfully attain and achieve the utmost in desirable physical and chemical properties in the final polymer.

In carrying out the necessary processing involving purification of the various monomers contemplated, such techniques as distillations are necessary. These distillations involve, under the most desirable conditions, the application of considerable quantities of heat to the monomer in order to effect the necessary separation of impurities from the monomer. These necessary distillation steps, even when carried out at relatively low temperatures where the "pot" temperature is of the order of 50° C., result in rather large losses of the initial charge due to the premature polymerization of the monomer in the pot. In the absence of any polymerization inhibitor, such losses may amount to 100% of the total charge, or in other words, processing in the absence of any inhibitor is completely worthless and well-nigh impossible if it is desired to obtain pure distilled monomer. With many of the well known inhibitors heretofore employed with vinyl type or ethylenically unsaturated monomers such as hydroquinone, p-tertiary butylcatechol and the like, the results are somewhat improved, but not sufficiently to render the processes economically feasible. Thus, with tertiary butyl catechol, losses are of the order of 25 to 50% in the pot. Hydroquinone, on the other hand, while a fair inhibitor, contaminates the distilled monomer to the point where, in subsequent polymerization reactions, undesirable color formation occurs. In addition, this particular inhibitor, present as a contaminant, prevents good control of the subsequent polymerization process with many of the desirable polymerization catalysts.

The problem of "pot" polymerization during distillation procedures has been successfully overcome by the use of the various inhibitors disclosed in my copending applications Serial Numbers 649,326 filed March 29, 1957 and now Patent No. 2,882,207; 649,305 filed March 29, 1957 and now Patent No. 2,945,844; and 656,192 filed May 1, 1957 and now Patent No. 2,886,494, wherein the outstanding, unusual, and unexpected effects of tetrahydroxyleuco anthraquinone, chloranil and aminoanthraquinones are disclosed. However, difficulties are often encountered in premature set-up of polymerization of the distilling monomer in the equipment between the "pot" and the collection point for the distilled monomer, and particularly in the distillation column. It has been heretofore suggested to employ as an auxiliary inhibitor, in addition to those suitable in the "pot," a non-volatile metallic inhibitor distributed throughout the fractionating or distilling column. Specifically, it has been suggested to use copper for this purpose. I have found that with the chloracrylate monomers with which this invention is concerned, copper is, in fact, a catalyst rather than an inhibitor, but that copper oxide (CuO) is an excellent and outstanding inhibitor for such purposes.

Additionally, it is desirable to inhibit the polymerization of the purified monomer during storage thereof. Under storage conditions the monomer may be subject to undesirable elevations of temperature. This influences the formation of polymer which is obviously undesirable when in storage. It has been found that copper oxide serves admirably to protect the monomer against such contingencies even though copper is substantially worthless for this purpose. Further, copper oxide is readily removable from the monomer by a simple decantation process and thus does not offer any problem in so far as subsequent polymerizations are concerned.

By virtue of the aforementioned discoveries, it is possible to process and purify monomers of α-chloroacrylic acid esters employing distillation techniques whereby there is minimized the formation of undesirable and premature polymer in the distillation equipment. Further, it is possible to store, for an unlimited time, the purified monomer, minimizing the potential hazards of heat in effecting premature polymer formation and further, thereby enabling the maximum in attainment of useful shaped polymer from the stored monomer.

It is therefore an object of my invention to provide a new process whereby monomers of α-chloracrylic acid esters may be processed and handled without premature polymerization thereof.

It is a further obect of my invention to provide a process whereby highly purified monomeric acid esters may be prepared devoid of contaminants which interfere with subsequent polymerization thereof.

It is still another object of my invention to provide processes for the distillation of α-chloracrylic acid esters employing heat whereby losses due to premature polymerization are minimized.

It is still another object of my invention to provide compositions comprising monomeric esters of α-chloracrylic acid which exhibit outstanding stability towards polymerization while under the influence of heat.

It is a further object of my invention to provide distillation processes whereby set-up and premature polymerization of α-chloracrylic acid esters is minimized.

It is a still further object of this invention to provide compositions comprising monomeric esters of α-chloracrylic acid which are characterized by outstanding stability towards polymerization while under the influence of elevated temperatures.

Other objects will appear hereinafter as the description proceeds. The objects of this invention are achieved by incorporating into the monomeric α-chloracrylic acid ester, copper oxide. The amount of this compound to be incorporated will, of course, vary, and is not critical, but it has been found that amounts from about 0.001% up to about 1% thereof based on the weight of the monomer provide adequate protection to the monomer under the conditions hereinafter to be described.

Where the copper oxide is employed in distillation processes, any suitable amount will be effective but it is preferred to distribute the inhibitor at all points in the system where the danger of premature polymerization, especially when due to elevated temperatures, is present. The copper oxide may be used as a deposit, coating or impregnant on the column packing material. The inhibitor may also be deposited on the walls and surfaces of the distillation equipment. Any other suitable method for effecting distribution of the inhibitor throughout the equipment may be resorted to so long as there is adequate contact with the monomer.

In order to determine the efficiency of polymerization inhibitors and make a comparison among the various compounds tested for such inhibition characteristics, the following test procedure was employed. Methyl-α-chloracrylate which had been previously vacuum distilled under pre-purified nitrogen and which possessed a freezing point of −36.26° C. was poured into 20 mm. outside diameter test tubes on which had been sealed 10 mm. outside diameter necks. These necks were attached to a 2 in. length of polyvinyl alcohol tubing which could be sealed off with a pinch clamp. The test tube had previously been coated with a solution of polyvinyl alcohol and Congo red. This solution, on drying, deposited a red film over the glass through which observation of the contents of the tube could be made, but which would filter out light of the wave lengths responsible for polymerization. Each of these tubes holds approximately 33 ml. of monomer when filled up to the neck at the point where the polyvinyl alcohol tubing is attached. The compounds to be tested for inhibiting characteristics are weighed into each tube prior to the addition of the monomer and each tube swept with pre-purified nitrogen. After adding the monomer to the tube, the polyvinyl alcohol tubing is pinched shut so that no air may contact the liquid monomer present below the pinch clamp. The tubes are thus sealed off and placed on a large mixing wheel which rotates at 3 revolutions per minute. The following heating cycle is employed in the test procedure:

4 days at 20–25° C.
5 hrs. at 50° C.
10 days at 20–25° C.
19 hrs. at 35–40° C.
3 days at 45–50° C.
5 days at 55–60° C.
remainder of time at 65–70° C.

Each of the tubes on the mixing wheel is observed to determine the time required to gel or to form a non-flowing polymer in the tube while rotating at 3 revolutions per minute. Employing the above described testing procedure, the following materials were used for each 33 ml. of methyl α-chloracrylate monomer:

| | G. |
|---|---|
| 1,5-diamino anthraquinone | 0.04 |
| 1-amino-4-hydroxy anthraquinone | 0.04 |
| Thiourea | 0.04 |
| Copper powder | 0.04 |
| Phenol | 0.04 |
| p-Tertiary butyl catechol | 0.04 |
| Sulfur | 0.04 |

The pure monomer with no added inhibitor was found to require 28 days to gel in the above described test procedure. The monomer containing copper powder gelled in 3 days 4 hrs., that containing the 1,5-diamino anthraquinone in 10 days, that containing the 1-amino-4-hydroxy anthraquinone in 18 days, with thiourea 20 days and with phenol 27 days. Each of these materials, thus, it will be observed, while heretofore described as vinyl type polymerization inhibitors, actually, with the monomers contemplated in this invention, instead of being inhibitors of the polymerization reaction, appeared to catalyze it. The p-tertiary butylcatechol, on the other hand, and sulfur gave somewhat better results, the former requiring 32 days and the latter 28 days. The same procedure employing 0.04 g. of copper oxide did not produce any gel of the monomer after 147 days, clearly indicating the vastly superior and unexpected inhibiting characteristics of this particular compound with the monomer with which this invention is concerned. The following examples will serve, further, to illustrate the vastly superior benefits to be derived from the use of the inhibitor above described.

*Example 1*

A charge of 1000 ml. of methyl-α-chloroacrylate having a freezing point of −37.62° C. and 1.2 g. of copper oxide is placed in a flask provided with a distillation column. The system is purged with nitrogen and then maintained under this gas. Thereafter the charge is distilled under a vacuum of 30 mm. of mercury employing a pot temperature range from 58 to 63° C. The recovery of purified monomer amounts to 974 ml. This represents a recovery of better than 97%. The resultant product has a freezing point of −36.57° C.

*Example 2*

The procedure of Example 1 is repeated employing, however, as the inhibitor p-tertiary butylcatechol in the same amounts. The recovery in this instance amounts to only 571 ml. of monomer which has a freezing point of −37.05° C.

*Example 3*

A charge of 1000 ml. of methyl-α-chloroacrylate and 2.1 g. of copper oxide which has a freezing point of −37.16° C. is placed in a suitable flask provided with a reflux distillation column. The column is packed with small squares (about a quarter of an inch on each side) of stainless steel foil, the corners of which have been turned to provide bulk, and therefore give sufficient free space in the reflux column. On these pieces of packing there is deposited copper oxide (CuO). The amount of the oxide employed is 5% based on the weight of the stainless steel packing. The entire system is then swept with nitrogen and maintained under this gas throughout the subsequent distillation operation which is carried out at a pot temperature of about 59 to 62° C. and under a vacuum of 30 mm. of mercury. Reflux time is 10 hrs. There is recovered from this procedure 982 ml. of monomer which has a freezing point of −36.29° C.

The above example establishes the efficiency of copper oxide as a polymerization inhibitor not only in the still pot from which it is completely non-volatilizable, but also the outstanding inhibiting characteristics of this compound at the reflux column where also it is desirable to have present inhibitor to prevent plugging of the column by polymer formation.

Example 4

A flask containing 1000 ml. of methyl-α-chloroacrylate previously purified by a vacuum distillation and having a freezing point of −36.50° C. and further devoid of any inhibitor is left standing under conditions simulating storage conditions. The contents in the flask are kept under nitrogen and the flask is sealed. The flask is then covered with a metallic foil to prevent any light from reaching the contents thereof. A similar product is stored containing 2.0 g. of copper oxide. After 3 months at room temperature, that is, about 65 to 75° F., it is observed that the uninhibited product has set up to a solid mass. In the flask containing the inhibitor, the monomer is still completely fluid. The latter is subjected to further storage at 100° F. for an additional 3 months and an examination at this time indicates the total absence of any polymer formation.

Example 5

A charge of 1000 ml. of methyl-α-chloroacrylate and 1.4 g. of copper oxide is placed in a flask provided with a reflux distillation column. The monomer has a freezing point of −37.42° C., indicating a relatively impure product. The reflux column is packed with Raschig rings. The system is then swept with nitrogen and maintained under this inert atmosphere throughout the subsequent distillation procedure. The temperature of the flask contents ranges during the distillation from 55 to 63° C. while under a vacuum of 30 mm. of mercury. After the refluxing has been in operation for about 3 hrs., it is noted that considerable polymer is being formed in the column and after 4 hrs. the column is practically completely plugged up, necessitating stoppage of the operation. At this time the recovery of monomer has been only 512 ml.

Example 6

The procedure of Example 5 is repeated except that the Raschig rings employed have deposited thereon 2% by weight based on the weight of the rings of copper oxide. This distillation proceeds smoothly and after 12 hrs. there is recovered 983 ml. of monomer having a freezing point of −36.40° C., which indicates an excellent recovery of a relatively pure product. This example demonstrates the necessity for having present in the reflux column where the monomer is exposed for extended periods of time to elevated temperatures, the inhibitor of this invention.

Example 7

From a flask which has been stored at room temperature for 6 months and containing 1000 ml. of methyl-α-chloroacrylate and 6.0 g. of copper oxide, the monomer characterized before storage as one having a freezing point of −36.42° C. and resulting from a vacuum purification process, there is decanted sufficient monomer into a mold. The mold consists of 2 sheets of glass spaced 0.496 in. apart. To the monomer there is also added as a polymerization catalyst 0.05% based on the weight of the monomer of dibutyl tin diacetate. The filled mold is held at room temperature for 30 hrs. and then exposed for 4 hrs. at 60° C., and finally cured for 3 hrs. at 145° C. The resultant polymer sheet exhibits outstanding light and heat stability characteristics, has excellent color, that is, absence of yellow, and further, has a smooth, almost optically perfect surface. This example demonstrates the ease with which the copper oxide polymerization inhibitor may be removed and/or separated from the monomer before polymerization of the latter with the attendant lack of any deleterious effect of the storage conditions on the monomer as manifested in the fine product obtained after polymerization.

Variations and modifications which will be obvious and apparent to those skilled in the art may be made in the procedure above described without departing from the scope and spirit of my invention.

I claim:

1. A process for purifying a liquid ester of α-chloroacrylic acid which comprises distilling said ester and contacting the distillate in a fractionation zone with copper oxide.

2. A process for purifying methyl-α-chloroacrylate which comprises distilling said compound through a fractionation column containing a polymerizing inhibiting amount of copper oxide.

3. In a process for purifying a liquid ester of α-chloroacrylic acid in a fractionation zone, the improvement which comprises contacting the ester in said zone with a polymerizing inhibiting amount of copper oxide.

4. In a process for purifying methyl-α-chloroacrylate in a fractionation zone, the improvement which comprises contacting the methyl-α-chloroacrylate in said zone with a polymerizing inhibiting amount of copper oxide.

5. In a process for purifying a substantially pure liquid ester of α-chloroacrylic acid involving the step of subjecting said ester to heat to distill the said ester and the further step of fractionating the distilling ester, the improvement which comprises carrying out the said steps of the process in the presence of copper oxide.

6. In a process for purifying methyl-α-chloroacrylate involving the step of subjecting said ester to heat to distill the said ester and the further step of fractionating the distilling ester, the improvement which comprises carrying out the said steps of the process in the presence of copper oxide.

7. In a process for purifying a liquid ester of α-chloroacrylic acid involving the step of subjecting said ester to heat to distill the said ester and the further step of fractionating the distilling ester, the improvement which comprises carrying out the first of said mentioned steps in the presence of from about 0.001% to about 1% by weight based on the weight of the methyl-α-chloroacrylic acid of copper oxide and the second of said mentioned steps in the presence of a polymerizing inhibiting amount of copper oxide.

References Cited in the file of this patent

UNITED STATES PATENTS

| | | |
|---|---|---|
| 2,233,835 | Crawford et al. | Mar. 4, 1941 |
| 2,241,770 | Driesbach | May 13, 1941 |
| 2,388,041 | Craig | Oct. 30, 1945 |
| 2,399,340 | Franz | Apr. 30, 1946 |
| 2,407,861 | Wolk | Sept. 17, 1946 |
| 2,466,501 | Steadman et al. | Apr. 5, 1949 |
| 2,476,528 | Barnes | July 19, 1949 |
| 2,694,726 | Anspon | Nov. 16, 1954 |
| 2,704,770 | Anspon | Mar. 22, 1955 |
| 2,786,739 | Eck et al. | Mar. 26, 1957 |

FOREIGN PATENTS

| | | |
|---|---|---|
| 528,761 | Great Britain | Nov. 6, 1940 |
| 750,358 | Great Britain | June 13, 1956 |